United States Patent
Vaughn et al.

(10) Patent No.: US 10,922,474 B2
(45) Date of Patent: Feb. 16, 2021

(54) UNSTRUCTURED UI

(71) Applicants: Robert Lawson Vaughn, Portland, OR (US); Tobias Kohlenberg, Portland, OR (US); Michael Moran, Naas (IE); Charles Baron, Chandler, AZ (US); Stephen Chadwick, Chandler, AZ (US); Munir Ghamrawi, Hillsboro, OR (US)

(72) Inventors: Robert Lawson Vaughn, Portland, OR (US); Tobias Kohlenberg, Portland, OR (US); Michael Moran, Naas (IE); Charles Baron, Chandler, AZ (US); Stephen Chadwick, Chandler, AZ (US); Munir Ghamrawi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 14/667,222

(22) Filed: Mar. 24, 2015

(65) Prior Publication Data

US 2016/0283536 A1 Sep. 29, 2016

(51) Int. Cl.
*G06F 16/22* (2019.01)
*G06F 40/117* (2020.01)
(Continued)

(52) U.S. Cl.
CPC ........ *G06F 40/117* (2020.01); *G06F 16/2272* (2019.01); *G06F 16/248* (2019.01);
(Continued)

(58) Field of Classification Search
None
See application file for complete search history.

(56) References Cited

U.S. PATENT DOCUMENTS

| 6,349,299 B1 | 2/2002 | Spencer et al. |
| 7,178,100 B2 * | 2/2007 | Call ...................... G06F 40/221 715/210 |

(Continued)

FOREIGN PATENT DOCUMENTS

| CN | 102089759 | 6/2011 |
| CN | 103995861 | 8/2014 |

(Continued)

OTHER PUBLICATIONS

"International Application Serial No. PCT/US2016/019295, International Search Report dated Jun. 30, 2016", 3 pgs.

(Continued)

*Primary Examiner* — Ashish Thomas
*Assistant Examiner* — Mellissa M. Ohba
(74) *Attorney, Agent, or Firm* — Schwegman Lundberg & Woessner, P.A.

(57) ABSTRACT

A system for implementing an unstructured user interface comprises a monitor module to monitor, at a compute device, input received at an electronic palette, the input producing a plurality of data elements; a data tagging module to tag each of the plurality of data elements with a corresponding timestamp; a data structure construction module to use the timestamps of the plurality of data elements to organize the plurality of data elements into a data structure; and a user interface module to present a user interface to a user of the compute device, the user interface based on the data structure.

24 Claims, 14 Drawing Sheets

(51) Int. Cl.
  *G06F 16/25* (2019.01)
  *G06F 16/28* (2019.01)
  *G06F 16/248* (2019.01)
  *G06F 40/174* (2020.01)

(52) U.S. Cl.
  CPC ............ *G06F 16/25* (2019.01); *G06F 16/285* (2019.01); *G06F 40/174* (2020.01); *G06F 2206/1008* (2013.01)

(56) References Cited

U.S. PATENT DOCUMENTS

| | | | |
|---|---|---|---|
| 7,536,413 B1 * | 5/2009 | Mohan | G06F 17/3071 |
| 9,508,387 B2 * | 11/2016 | Krukar | G11B 27/11 |
| 9,779,147 B1 * | 10/2017 | Sherman | G06F 16/2423 |
| 2011/0158603 A1 | 6/2011 | Krukar et al. | |
| 2011/0282687 A1 | 11/2011 | Koll | |
| 2012/0054596 A1 | 3/2012 | Kroger et al. | |
| 2014/0047375 A1 | 2/2014 | Koll et al. | |
| 2014/0208217 A1 | 7/2014 | Carasso et al. | |
| 2014/0278406 A1 | 9/2014 | Tsumura et al. | |
| 2014/0297646 A1 | 10/2014 | Bastiaens et al. | |
| 2015/0012840 A1 * | 1/2015 | Maldari | H04L 65/60 715/748 |
| 2015/0066935 A1 | 3/2015 | Peters et al. | |
| 2016/0291847 A1 * | 10/2016 | Lee | G06F 3/04847 |

FOREIGN PATENT DOCUMENTS

| | | |
|---|---|---|
| CN | 104050221 | 9/2014 |
| CN | 104239506 | 12/2014 |
| CN | 107251010 | 10/2017 |
| WO | 2014152997 | 9/2014 |
| WO | 2016153695 | 9/2016 |

OTHER PUBLICATIONS

"International Application Serial No. PCT/US2016/019295, Written Opinion dated Jun. 30, 2016", 6 pgs.

"International Application Serial No. PCT/US2016/019295, International Preliminary Report on Patentability dated Oct. 5, 2017", 8 pgs.

"European Application Serial No. 16769262.3, Extended European Search Report dated Oct. 19, 2018", 11 pgs.

"Smart tag (Microsoft)—Wikipedia", Retrieved from the Internet: URL:<https://en.wikipedia.org/w/index.php?title=Smart_tag_(Microsoft)&oldid-637141262> [retrieved on Oct. 12, 2018], (Dec. 8, 2014), 3 pgs.

"European Application Serial No. 16769262,3, Response filed May 17, 2019 to Extended European Search Report dated Oct. 19, 2018", 20 pgs.

"Chinese Application Serial No. 201680010441.7, Office Action dated Sep. 11, 2020", 10 pgs.

* cited by examiner

Name
Mary Montana          Jack
Mike                  Jill
George Houston        Bill
                      Wendy
                      Sandy
                      Claire Saturday     505-333-7777
           Saturday     505-444-6666
           Sunday       505-222-4444
           Claire on Saturday

*FIG. 3*

Name
Mary Montana          Jack
                      Jill

Saturday    505-333-7777

*FIG. 4A*

Mike

Bill

Saturday   505-444-6666

*FIG. 4B*

George Houston

Wendy
Sandy
Claire

Sunday     505-222-4444
Claire on Saturday

*FIG. 4C*

| 1 | Name<br><br>Mary Montana | Jack<br><br>Jill | Saturday | 505-333-7777 |
|---|---|---|---|---|
| 2 | Mike | Bill | Saturday | 555-444-6666 |
| 3 | George Houston | Wendy<br><br>Sandy<br><br>Claire | Sunday<br><br>Claire on Saturday | 555-222-4444 |

UNSTRUCTURED UI

TECHNICAL FIELD

Embodiments described herein generally relate to data organization and presentation and in particular, to an unstructured user interface.

BACKGROUND

Unstructured data refers to information that does not have a pre-defined data model or is otherwise unorganized. Capturing and organizing unstructured data is a difficult task.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 is an example of an electronic input palette, according to an embodiment;

FIGS. 4A-C illustrating input over time, according to an embodiment;

DETAILED DESCRIPTION

Systems and methods described herein provide a user interface for unstructured data. Unstructured data by definition has little or no underlying data structure. Capturing the unstructured data and creating a data model is an initial phase. A later phase is to create a user interface to browse, search, or navigate the transformed unstructured data using the generated data model. In a circular fashion, as more data is received, recognized, and modeled, the corresponding user interface used to manage the data may be evolved. Thus, a coherent, intuitive platform for collecting, retrieving, and interacting with unstructured data may be provided to a user.

Figure 1:
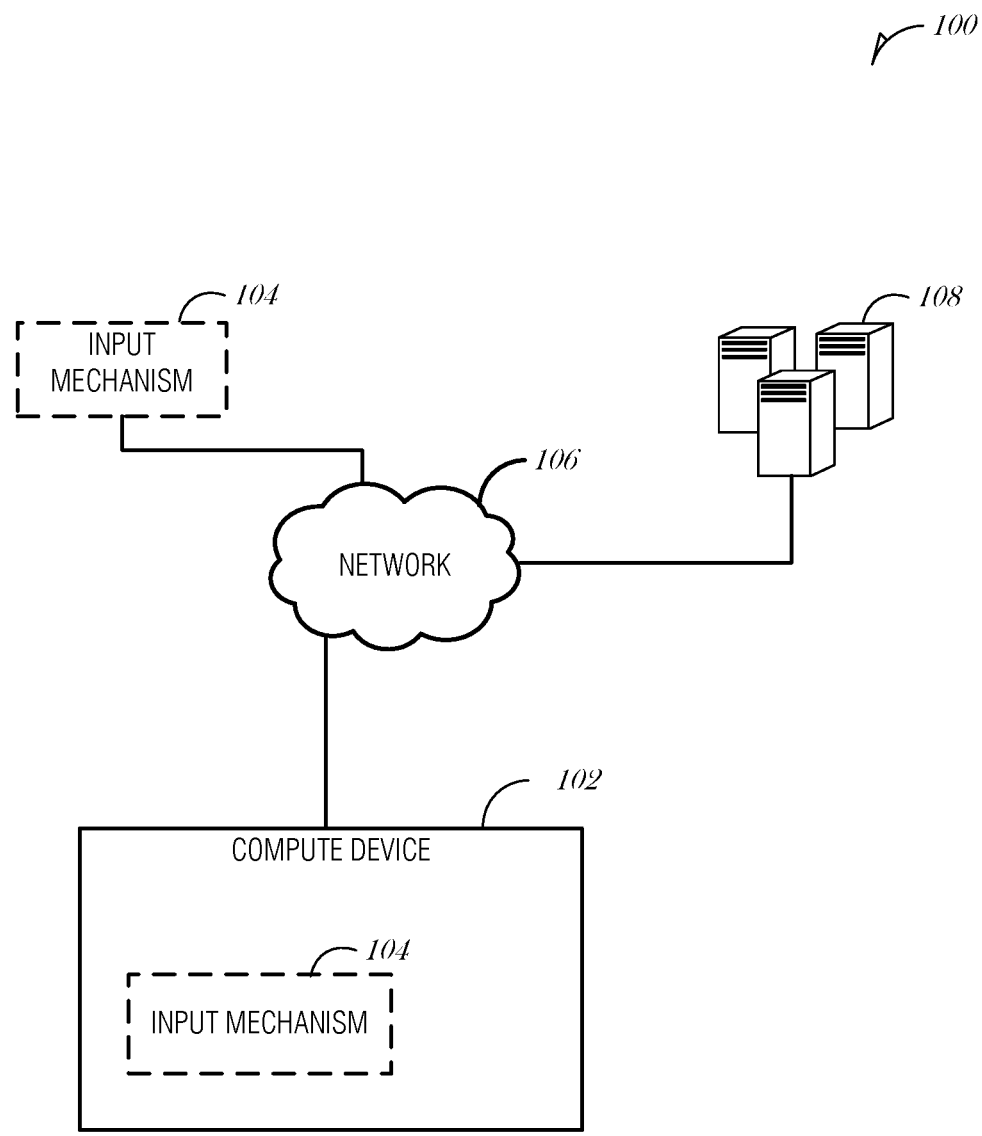
FIG. 1 is a schematic drawing illustrating a system for capturing, analyzing, and presenting unstructured data, according to an embodiment.

FIG. 1 is a schematic drawing illustrating a system 100 for capturing, analyzing, and presenting unstructured data, according to an embodiment. The system 100 includes a compute device 102 having a user input mechanism 104. The compute device 102 may be communicatively coupled via a network 106 to a server system 108. The compute device 102 may be a device such as a smartphone, cellular telephone, mobile phone, laptop computer, tablet computer, wearable device (e.g., watch, glasses-based device, etc.), desktop, laptop, hybrid, in-wall, or other networked device.

The user input mechanism 104 may be separate from the compute device 102 or incorporated into the compute device 102. The user input mechanism 104 may be paired with the compute device 102 using a short-range wireless network, such as Bluetooth®. The user input mechanism 104 may be one of any type of devices, including but not limited to, a camera, a mouse, a digitized pad, a graphics tablet, a digitizer, a touchscreen, a touchpad, or the like. While only one user input mechanism 104 is illustrated in FIG. 1, it is understood that more than one user input mechanism 104 may be implemented and that some user input mechanisms 104 may be incorporated into the compute device 102, while other user input mechanisms 104 may be separate from the compute device 102.

The network 106 may include local-area networks (LAN), wide-area networks (WAN), wireless variant networks (e.g., wireless LAN (WLAN) such as a network conforming to an IEEE 802.11 family of standards or a wireless WAN (WWAN) such as a cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices in FIG. 1 may be coupled to the network 106 via one or more wired or wireless connections.

The compute device 102 may also be communicatively coupled to the server system 108. The server system 108 may provide one of a variety of services including, but not limited to, data analysis, data storage, or the like.

In use, a user operates the user input mechanism 104 to enter a variety of freeform information into the compute device 102. The freeform information may include text data, photographic data, video, or the like. The compute device 102 analyzes the freeform information to establish relationships among the information, create a data schema, and present a user interface to the user to allow the user to browse, search, or manipulate the information or the data schema.

In general, the information entered in an unstructured user environment, such as on a blank drawing page or a fresh word processing document. The user may be collecting information before any business or data modeling requirements are fully understood. Thus the user may not have a structured user interface to immediately operate within. Using the system 100 illustrated in FIG. 1, the user is able to enter unstructured data in a freeform manner and allow the system 100 to infer structure and create the underlying database and a user interface to further manipulate the structured data. There is no need for the user to provide labels, use a particular program, or have any foreknowledge of how to enter data—the user simply starts entering data and the system 100 is able to determine records, data fields, and elements of the data structure.

Data structure may be inferred and determined by the system 100 using various mechanisms including contextual analysis of the information collected, known data structures, global or localized representational models, crowd sources wikis, commonly extended attribution, boundary validation, and machine learning. As the user enters information, the system 100 may track when the data was entered, where on the screen the data was entered, and other contextual cues to create relationships among the data. The system 100 is able to constantly change and adapt based on additional information received or inferred. By doing so, the system 100 does not require perfect input or perfect interpretation of input data. Instead, the system 100 is able to adjust over time to better fit the data to a data structure, and provide a more accurate user interface to interact with the data and data structure.

In use, the user may start with a relatively blank interface, such as a blank page or drawing palette. As the user inputs data, the system 100 observes context such as timing, order or entry, and awareness of commonalties with the data to construct a data structure. As the data structure is delineated, a user interface may be generated and presented to the user to browse or otherwise manipulate the data or the data structure.

People tend to organize data without conscious effort. For example, when making lists, people may group similar items together or make a list with more important items at the top of the list. Programmatic logic used in the system 100 observes timing of data input to help define record groups (e.g., related data fields are input at approximately the same time). Data fields may be defined by observing the screen coordinates of the data (e.g., data fields for each record group are arranged near one another). One-to-many relationships may be defined by carriage returns or new line breaks. Text analysis may be used to determine data types. Outlier data may be first bucketed and characterized as a comment or other generic field, and then further processed using comparisons with other outlier data, other fields, additional record groups, or the like. The knowledge derived from the data analysis is then used to create various user interface controls (e.g., text boxes, control buttons, etc.).

Figure 2:
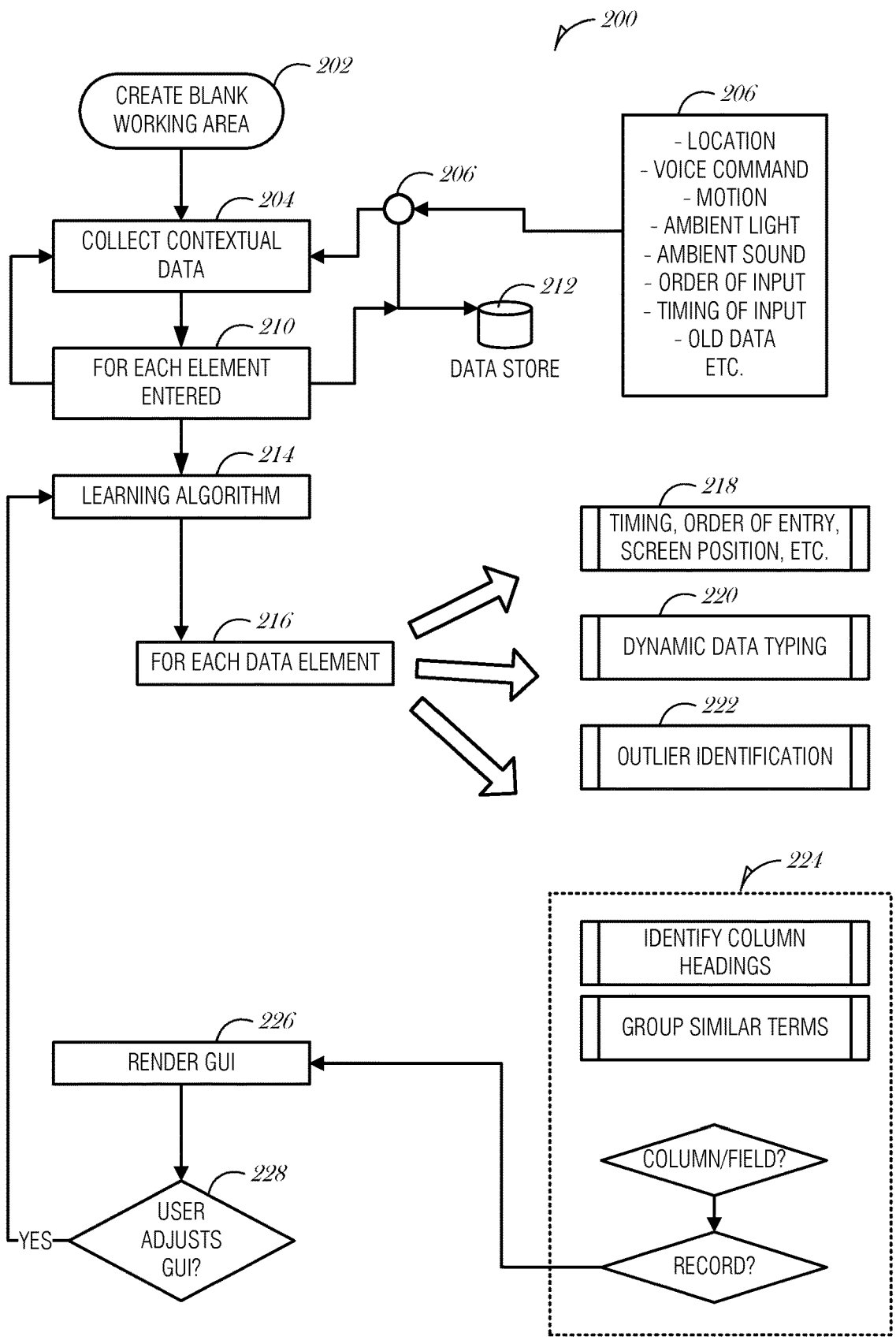
FIG. 2 is a data flow diagram illustrating a process of parsing unstructured data, according to an embodiment.

FIG. 2 is a data flow diagram illustrating a process 200 of parsing unstructured data, according to an embodiment. At 202, a user starts by creating a blank working area (e.g., page or canvas). The working area may be a word processing document, a drawing canvas, or some other electronic document. The user may input data using stylus, physical keyboard, virtual keyboard, or the like. As the user inputs data, contextual data is collected (block 204). Some of the contextual data may be collected by sensor 206. The sensor 206 may be a microphone, a camera, or the like. Various contextual data (block 208) may be obtained and stored, such as the location of the input (e.g., screen coordinates), location of the user (e.g., geographic location), ambient sound, voice commands and recognition, similarity to data entered in the past, timing of input, order of input, or the like. Analysis of input is performed on each data element entered (block 210) and the results of the analysis may be stored in data store 212. Data store 212 may also include results from previous analysis.

As the user interacts with the system 100, a learning algorithm is used (block 214) to analyze the data elements and user interactions to adjust data structure, data typing, or user interface elements. The learning algorithm may analyze each data element (block 216) using various factors 218, such as timing, order of entry, and screen position, to perform various operations, such as dynamic data typing 220, outlier identification 222, or data structuring 224. For example, based on the input characteristics, fields and records may be identified and a data structure may be constructed.

Based on the data structure, a user interface is rendered (block 226). The user may interact with the user interface (block 228) to add or remove fields, adjust column names, change data, sort data, etc. Based on these adjustments, the learning algorithm may waterfall and change other data types, groupings (e.g., records), or the like to revise the underlying data structure and the resultant user interface.

Record creation, dynamic data typing, outlier identification, and data structuring are described using the following example scenario. This scenario is intentionally described with inconsistencies to illustrate how the system 100 may adapt to how the user enters data.

A person named Sue sits down with her tablet computer at a soccer field. There is a blank page on the screen. Her intent is to create a collection (e.g., a database) of information for a children's soccer team registration. She does not understand forms, labels, or RDBMS concepts. Sue aims to collect the parent's name, child's name, preferred practice day, and contact phone number.

Figure 4B:
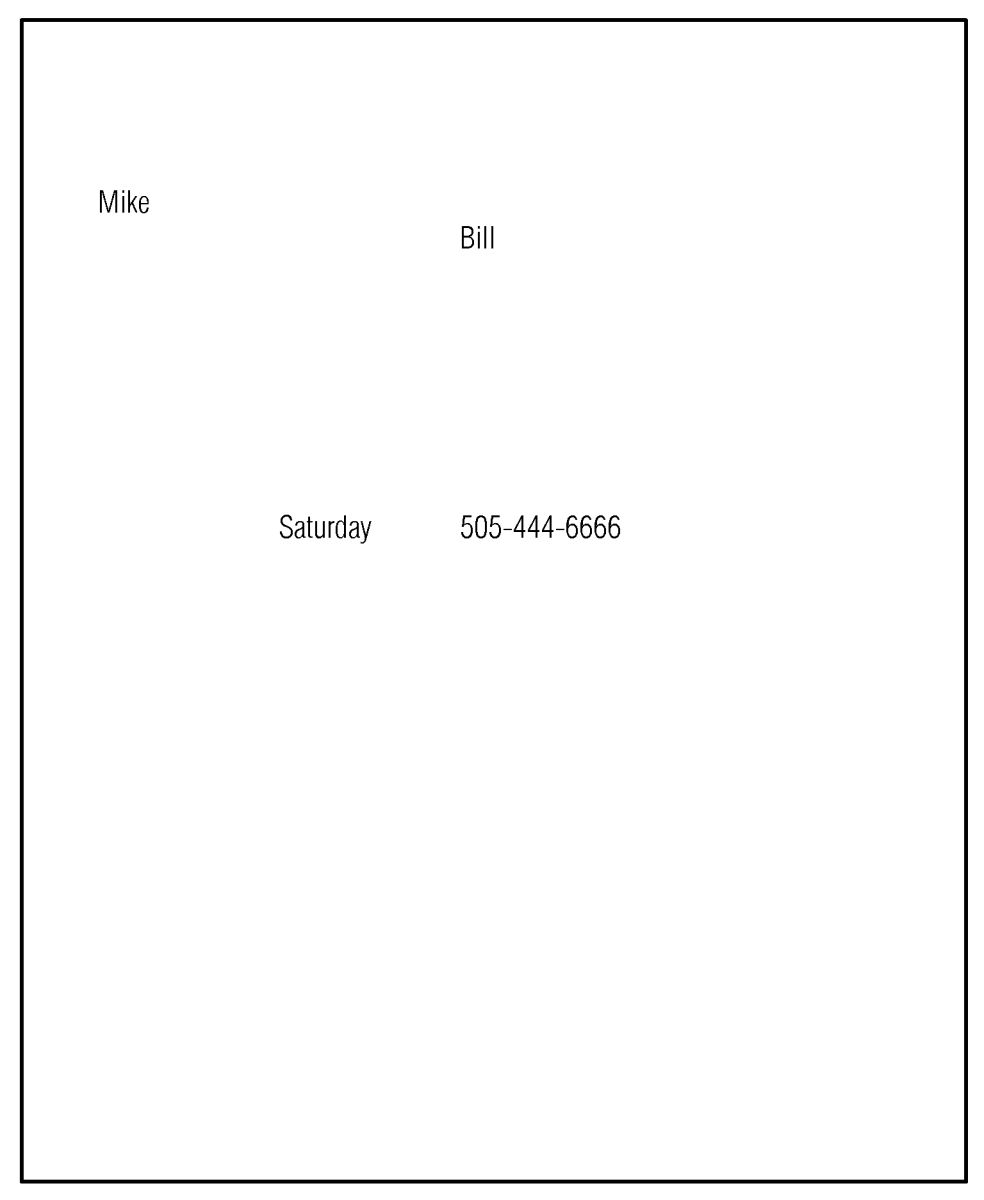

Sue creates a blank page and types "Name." As the parents interact, Sue collects the information. After three parents' information is taken, the page may look like that shown in FIG. 3. FIGS. 4A-4C illustrates the screen of FIG. 3 when time sliced. The timing of various input may be captured as contextual data (block 204) and analyzed (block 218) in the flow described above in FIG. 2. FIG. 4A illustrates the first time slice, e.g., when "Mary Montana" provides information about her children, Jack and Jill. FIG. 4B illustrates a second time slice when "Mike" provides information about his son "Bill." FIG. 4C illustrates a third time slice where "George Houston" provides information about his children, "Wendy," "Sandy," and "Claire." While Wendy and Sandy want to attend on Sunday, Claire is noted that she will be attending on Saturday.

Figure 5:
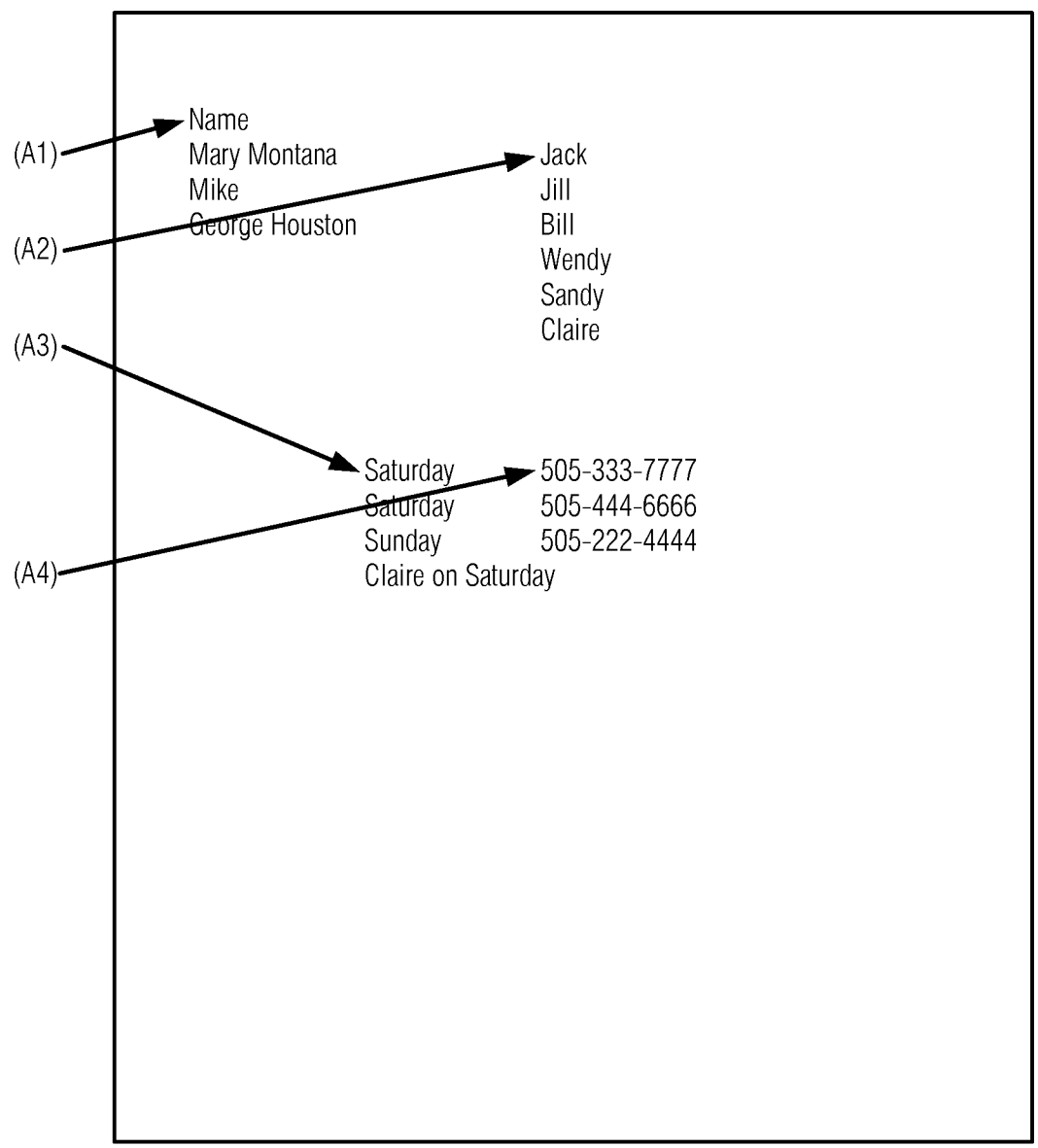
FIG. 5 illustrates an instance of data groups, according to an embodiment.

Using time slicing may provide a rough mechanism to infer records of related information. The position that the data was entered on the screen is then used as a mechanism to identify fields of similar data. In this case, four potential fields are identified using the initial input position and the relative proximity to previous input positions. This is illustrated in FIG. 5 with column identifiers "A1," "A2," "A3," and "A4." Data grouping may be performed by using coordinate graphs or by using markup indicators, such as line breaks. With time slicing and position-based grouping, a rough data structure may be generated.

Figures 6, 7:
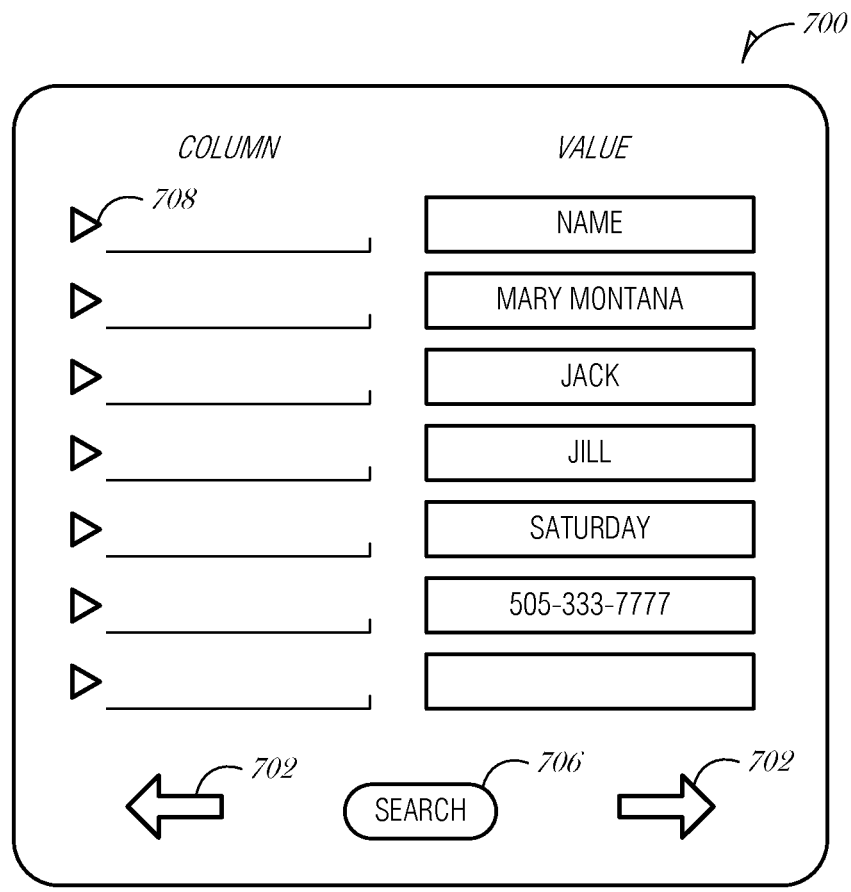
FIG. 6 illustrates a generated database structure, according to an embodiment.
FIG. 7 illustrates an example user interface, according to an embodiment.

FIG. 6 illustrates a generated database structure 600, according to an embodiment. The database structure 600 includes one row for each time slice and one column for each data grouping. Timing may be used to define records, fields (e.g., columns) may be defined using screen coordinates at the start of text entry, and one-to-many, many-to-one, or many-to-many relationships may be defined by carriage returns. In the examples illustrated in 4A-4C, a one-to-many relationship between "Mary Montana" and her children may be inferred by recognizing a carriage return after the text entry "Jack" and then an entry of "Jill." This is illustrated in the first row of the database structure 600. Similarly, the record of "George Houston" and his children may be parsed with a one-to-many relationship between the parent and his children. While both time slicing and location-based grouping are used in this example, it is understood that time slice may be used alone to identify records. This type of analysis may be performed independently of location, thus a single-line input mechanism may be used to define records for example.

At this point in processing, the records may be presented using a basic user interface generated from the database structure 600. An example user interface is illustrated in FIG. 7, where each element of a record is provided as a data field in a user interface. Paging buttons 702, 704 are presented to allow the user to move forward or backwards through the database records. Using conventional user interface design methods, the paging buttons 702, 704 may be programmed to deactivate (e.g., grey out) when reaching the end of the records in one direction. Alternatively, the paging buttons 702, 704 may be used to navigate through the records in a circular manner, such that when reaching the end of the records, if the user using the "next" paging button 704, the user is navigated to the first record in the records. A search button 706 is also presented, which provides a mechanism to search the records using various mechanisms, such as a full text search, data type search, range filtering, regular expressions, and the like. Each field may also have a corresponding control (e.g., item 708) to allow the user to name the field. When a field name is provided, the corresponding database column may be updated to match. This is illustrated in the continued example below.

After the initial record and field classification, further methods may be applied to determine data types (e.g., dynamic data typing, block 220 in FIG. 2). Data typing may be performed using machine learning and human language analysis. For the first record entered, the phrase "Name" may be identified and classified as a "text" data type with a generic meaning. The phrase "Mary Montana" may be identified and classified as a "text" data type with a "name" meaning. Similarly, the phrases "Jack" and "Jill" may be identified and classified as "text/name" data types. The phrase "Saturday" may be classified as a "text/day" data type and the phrase "505-333-7777" may be classified as a "text/phone" data type.

Figure 8:
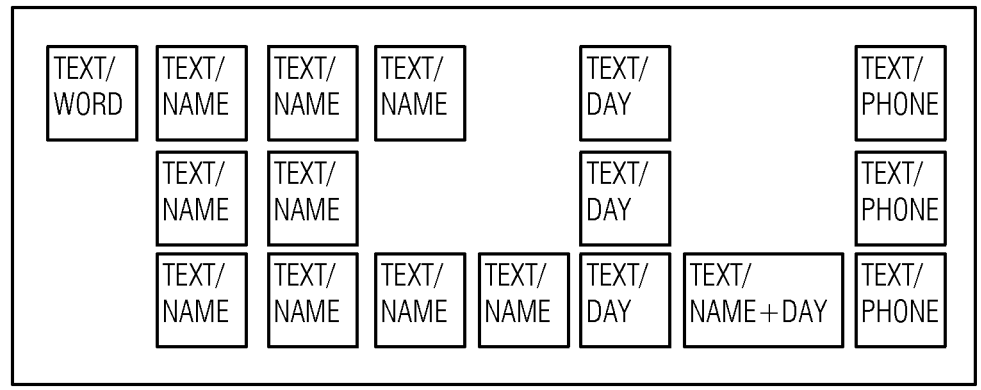
FIG. 8 is an example of how the records may be organized by data type, according to an embodiment.

Using these data types, the system 100 organizes the records. FIG. 8 is an example of how the records may be organized by data type, according to an embodiment. While fields, such as day and phone, are well defined, there are still some unresolved data fields, such as the text/word and text/name+day fields, which correspond to the phrases "Name" and "Claire on Sunday," respectively. Thus, after performing the initial data typing, outlier data fields are parsed and analyzed (e.g., block 222 in FIG. 2).

Figure 9:
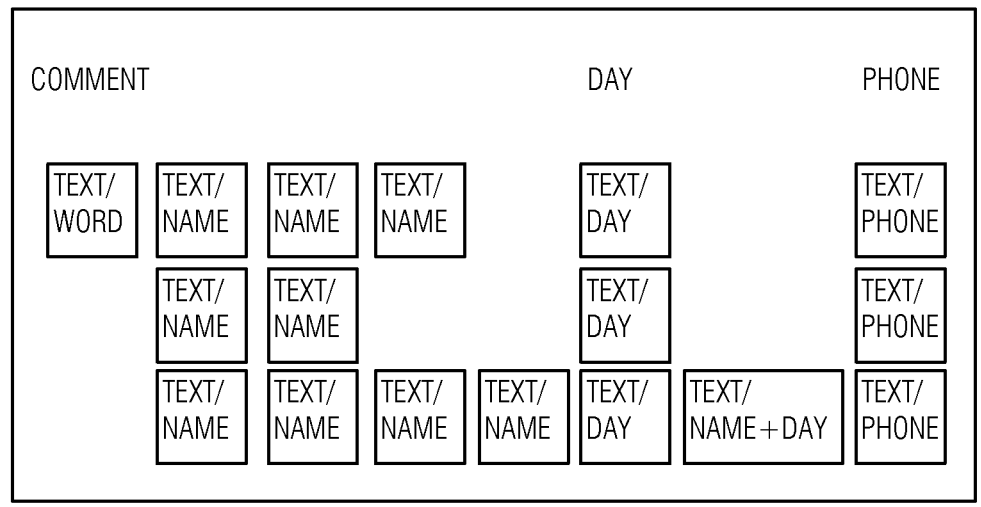
FIG. 9 illustrates the data structure with column headings, according to an embodiment.

An outlier field is one that does not neatly fit with other data type expressions. In the present example, there are two identified outlier fields, "Name" and "Claire on Sunday." The word "Name" was entered by Sue perhaps in an attempt to provide a cue about the data she was going to collect. Regardless, the system 100 has so far determined that the word "Name" does not align or group with other data. The system 100 uses a logic rule that provides if a data element has no logical placement in the data structure, then it will be flagged as an outlier and will be categorized miscellaneous category, something akin to a "comment." FIG. 9 illustrates the data structure with column headings, according to an embodiment. The column heading "Comment" has been added and the text/word data is placed in that column. Additionally, the column headings "Day" and "Phone" have been added above the well-defined data for days and phone numbers.

Another outlier exists, defined as text/name+day. Keep in mind that this field contains "Claire on Saturday." It could easily contain something like "Claire not on Saturday." The system 100 relies on human nature to have included this phrase for a reason—it is assumed to be relevant. While the string could potentially be something like "pickles are green" this phrase would not be relevant to what Sue was trying to do. Therefore, the system 100 assumes that it has meaning. That meaning, based on its position in the flow of text, will allow the system 100 to assume a relationship to either the preceding or subsequent text. Imperfection is acceptable in this situation because of the feedback provided by the user at later stages and the machine learning used.

Outlier processing asks various questions, such as "Does the data type fit anywhere in the current record?" and "Does the data type have similar types found in other records?" If the outlier data does not match a data type of the current record or other records, then the outlier data is deconstructed further. In this case, the outlier data "Claire on Saturday" may be deconstructed using the space as a delimiter. Other delimiters may be used such as commas, semicolons, slashes, etc. After breaking apart a phrase, each element is analyzed with the same questions. The string "Claire" is identified as a name and matched to an existing data type in the current record as well as other records. Similarly, the string "Saturday" is identified as a day and matched to existing data types.

The system 100 knows that the phrase "Claire on Saturday" was entered after the word "Sunday" using timestamp metadata captured while Sue entered the information. Additionally, the system 100 knows that the phrase was entered near the word "Sunday" using screen coordinate data captured when Sue entered the information. The system 100 may use a proximity-based rule to give a stronger association to entries that precede or follow the phrase in question. Given that the subsequent entry was a phone number, the system 100 will give priority to the preceding data element of "Sunday," which is of the same data type of one of the components of the phrase "Claire on Saturday."

Thus, the system 100 determines that the phrase "Claire on Saturday" is proximity in time and position to "Sunday" and that the name "Claire" also exists in the record. The system 100 then has to determine whether to place "Claire on Saturday" in a comment field or whether there is a different relationship to other data in the record.

By analyzing the record for the parent "George Houston," the system 100 may determine that the name "Claire" appears twice when the deconstructed phrase "Claire on Saturday" is included in the record's structure. The system 100 uses relational database concepts to reorganize the record into two records with a primary key of "George Houston" where the first record includes the people "Wendy" and "Sandy" associated with the day "Sunday," and the second record includes the person "Claire" and the day "Saturday."

Figure 10:
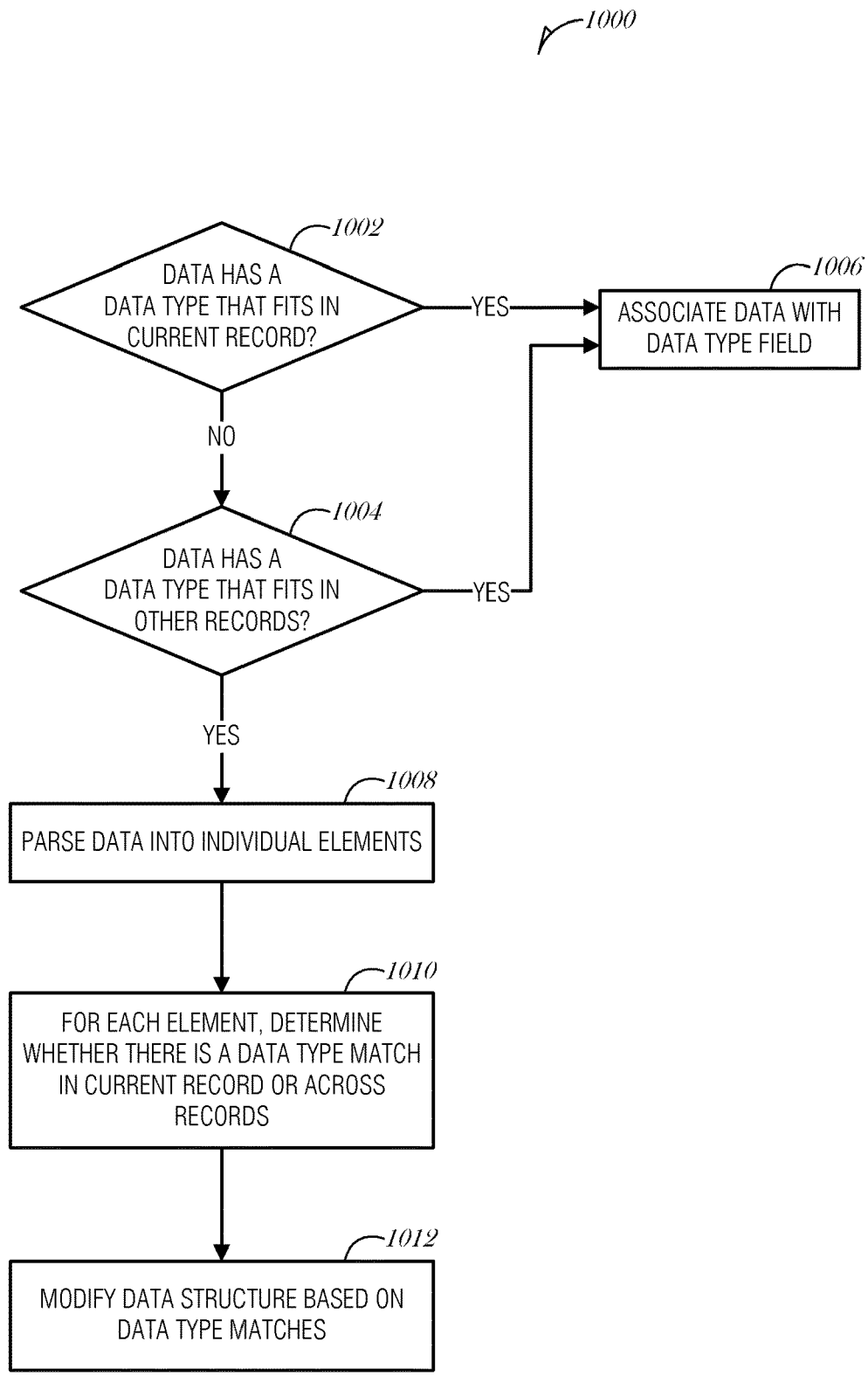
FIG. 10 is a flowchart illustrating a method of processing outlier data, according to an embodiment.

FIG. 10 is a flowchart illustrating a method 1000 of processing outlier data, according to an embodiment. At operation 1002, it is determined whether the data type of the data in question fits anywhere in the current record. This may be performed using a reverse regular expression matching process. If the data in question is not of a data type that fits in the current record, then at operation 1004, it is determined whether the data in question has a data type that fits in other records. If the data in question fits as a data type of the current record or across records, then the data is associated with a data type in the data structure (operation 1006).

If instead the determination is negative, then the system 100 attempts to parse the data into individual elements (operation 1008). This may be performed using a substring identification mechanism, such as partitioning a string based on delimiters (e.g., space, comma, semicolon, etc.). For each element of the parsed data, the system 100 determines whether there is a matching data type within the current record. Failing that, the system 100 determines whether there is a matching data type across other records (operation 1010).

Based on the data type matches, the data structure may be modified, for example, to represent a data relationship (operation 1012), e.g., parent "George Houston" is related to persons "Wendy," "Sandy," and "Claire" in a one-to-many relationship and each of these people "Wendy," "Sandy," and "Claire" are related to a day with a one-to-one relationship. Prior to this processing, it appeared that the child-to-day relationship was a many-to-one relationship (e.g., Jack and Jill related to Saturday).

Figure 11:
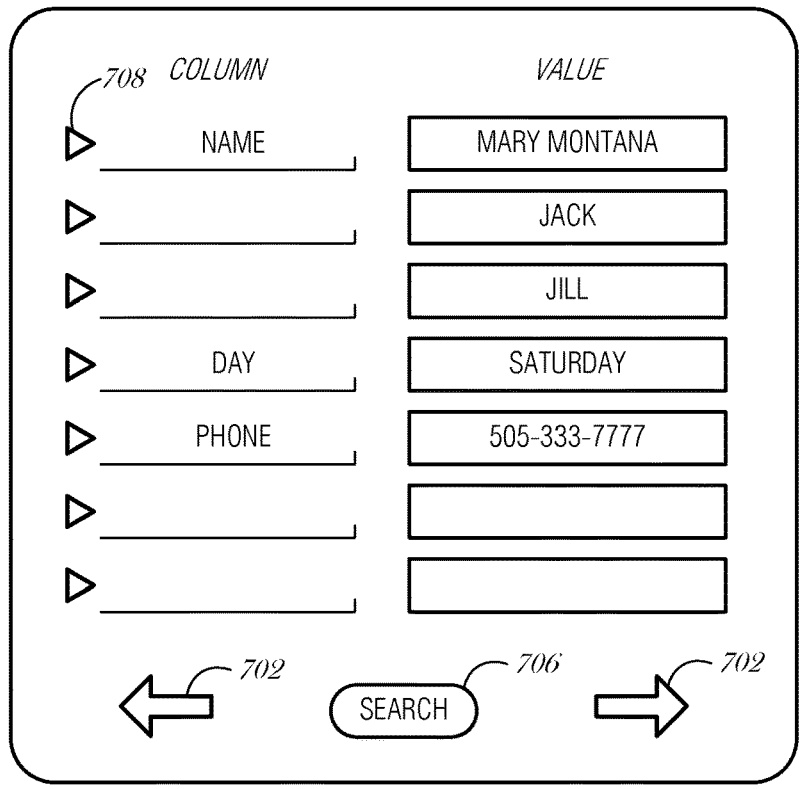
FIG. 11 illustrates an example user interface, according to an embodiment.
Figure 12:
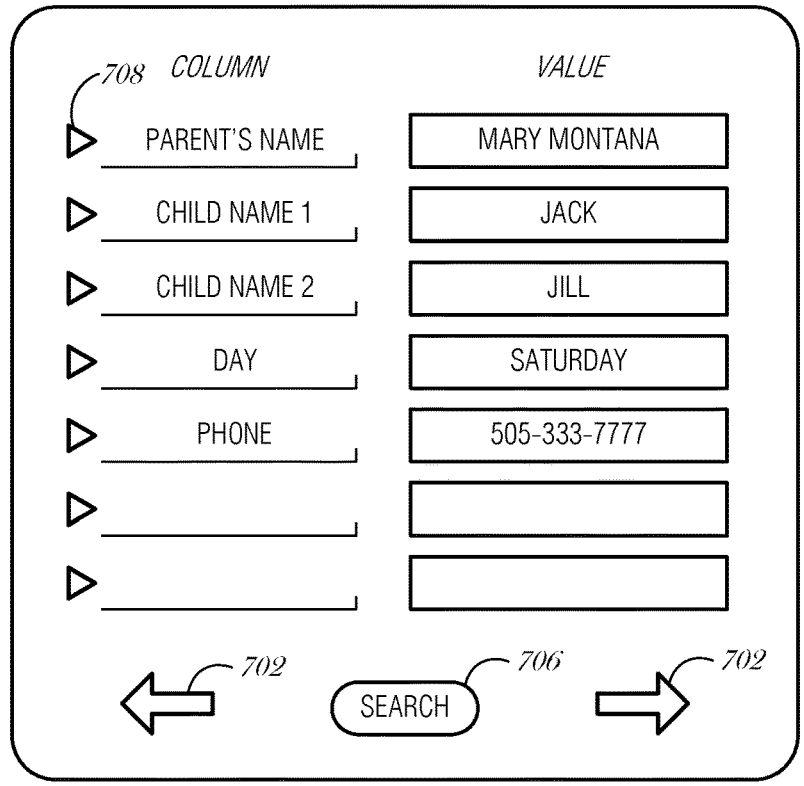
FIG. 12 illustrates the user interface of FIG. 11 after being revised, according to an embodiment.
Figure 13:
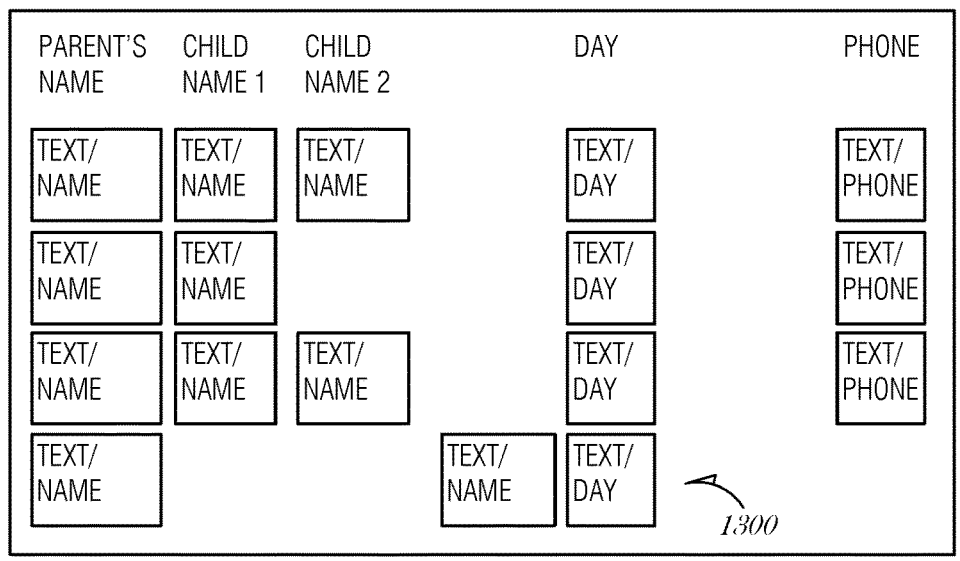
FIG. 13 illustrates the data structure with column headings after being revised according to FIG. 12, according to an embodiment.
Figure 14:
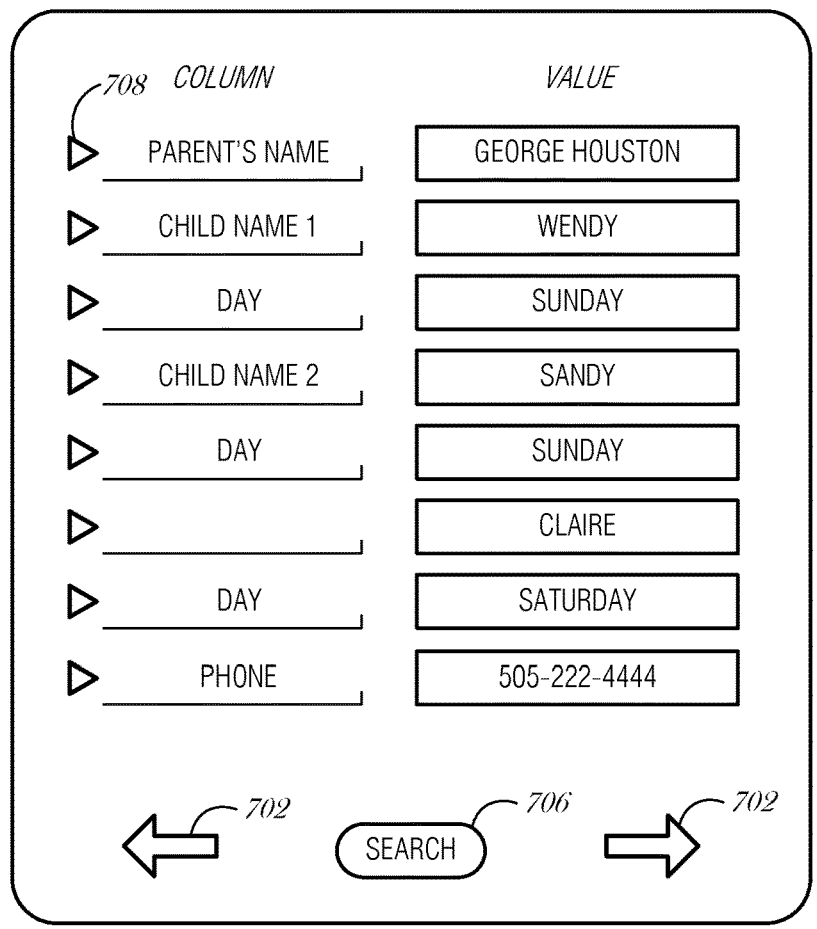
FIG. 14 illustrates the user interface of FIG. 12 after being revised, according to an embodiment.

At this point, the data structure is fairly well-defined and a user interface may be generated and presented to the user (e.g., Sue), as illustrated in FIG. 11. The data analysis provides some of the column/field names, such as "Name" and "Day." However, the system 100 was unable to determine the field name for "Jack" and "Jill." The user may interact with the user interface, such as by activating the user interface control 708, and edit the column name. For example, Sue may change the column name "Name" to "Parent's Name" and the blank column names to "Child Name 1" and "Child Name 2." The revised user interface is illustrated in FIG. 12. After modifying the user interface, the underlying data structure is correspondingly modified. This is illustrated in FIG. 13. FIG. 13 also illustrates how the previously ambiguous data "Claire on Saturday" is restructured as an additional row 1300. The constructive primary key of "George Houston" is reused on the additional row 1300. The user interface may be revised to illustrate this new relationship, such as is illustrated in FIG. 14. Note that the column name for "Claire" is blank because this is the first time a user interface with a third child name has been presented to Sue. Alternatively, the system 100 may recognize that Sue previously revised the column names for similar data types according to a standard naming structure, and using additional analysis, the system 100 may present "Child Name 3" as the column name for "Claire." The user may then be able to revise this label as needed. If the user does not revise the label, then the system 100 may use this non-action by the user as tacit approval for the label name, which may reinforce future attempts at label naming.

Another description of the overall process flow is provided for additional details of alternative embodiments. As data is entered, various contextual information may be gathered including the order of entry, the timing between words or numbers entered, the placement of the data on the page or relative to other data, or sensor data (e.g., global positioning data). Records are then delineated based on timing using the human tendencies to pause between entries of records. If timing alone is insufficient to delineate records, then the entirety of the data entered may be analyzed to determine where there are repeatable elements, which may indicate a record-like structure. For example, repeating data with data types of name, date, time, name, date, time, etc., may provide insight into a record structure having a name, a date, and a time per record.

At this point, the system may be reasonably confident that records are properly delineated. The user may click a button to "View UI" or similar control presented on the input palette and see how the system is proposing data organization. The user may then manipulate the data structure using various user interface control mechanisms (e.g., drag and drop, drop lists, query tools, etc.). After additional user interaction or automated system recognition and data structuring, the records may reach a point that is considered well-defined.

The fields (e.g., data elements or columns) within the records are then analyzed to determine whether any of the data was input to indicate a field name (e.g., column header) or whether there is outlier data in the fields.

For each field, the system analyzes the order of entry. The system attempts to identify if any entered data may be defined as a field name. Examples may include "name," "date," "qty," "size," etc. The order of entry considers the timing or delay between entries. The order of entry may also consider whether several data items should be merged together into a string. This may be performed using language analysis, timing of entries, or the like.

The data for each field, which may be a word, string, number, or the like, along with their corresponding order of entry is then loaded into a matrix. The matrix is used to compare data across records. The cross-record analysis looks at the data within each field to see if the data has similarities based on order the entry. Similarities may be based on comparisons of data types (e.g., string, word, integer, etc.). Where similarities are found across fields, then data type assignment to those fields is reinforced. One way of maintaining the strength of the data fields is by using a numerical scoring system. When similarities are found, then the numerical score may be increased indicating a confidence that the data typing for a particular field is correct.

The analysis may also look at the data within each field to see if the data has similarities with respect to the placement on the screen, regardless of the order of entry. Placement of fields near each other on the input palette may be used to infer a relationship, such as a similar data type. Using placement as another similarity metric, the numerical confidence score may be adjusted to indicate a more or less likelihood of correctness of a field's data type assignment.

Comparing the cross-record data type analysis and the placement data type analysis may provide insight into which method provided a better match. If scoring for both methods is low, such as below a 50% confidence level, then a more complex analysis may be used.

The more complex method includes comparing every field to every other field across every record. The comparisons are scored and kept in a matrix that corresponds to the fields' placements. After all of the comparisons are completed, the fields' data type assignments may then be based on the scoring across the matrix.

Outlier data is identified as those data elements for which there is no scoring or low scoring across records. Outliers may be flagged and placed in a generic catch-all field, such as a comments or miscellaneous field, to be later manually typed. Alternatively, the outlier data may be analyzed, such as by breaking a string into constituent elements and analyzing each element across one or more fields in the record or across fields in other records. Additionally or alternatively, the outlier data may be analyzed for conjunctive expressions such as "AND" or "OR," which may be used to break apart a string into logical elements. For example, the string "Saturday or Sunday" may allow for either individual element to score well, but when taken together as the scoring may be low. The awareness of the "or" in the string allows the system to match on "Saturday" or "Sunday" and to find a better match with a different field or record. Such analysis may be used to initially identify a possible data type or reinforce a presumptive data type.

During the data analysis and data structuring, the user may be presented with options to have the system continuously update the UI and data assignments as new records are added or the user may lock the UI, effectively forcing the system to parse additional records into the fixed underlying data structure.

Figure 15:
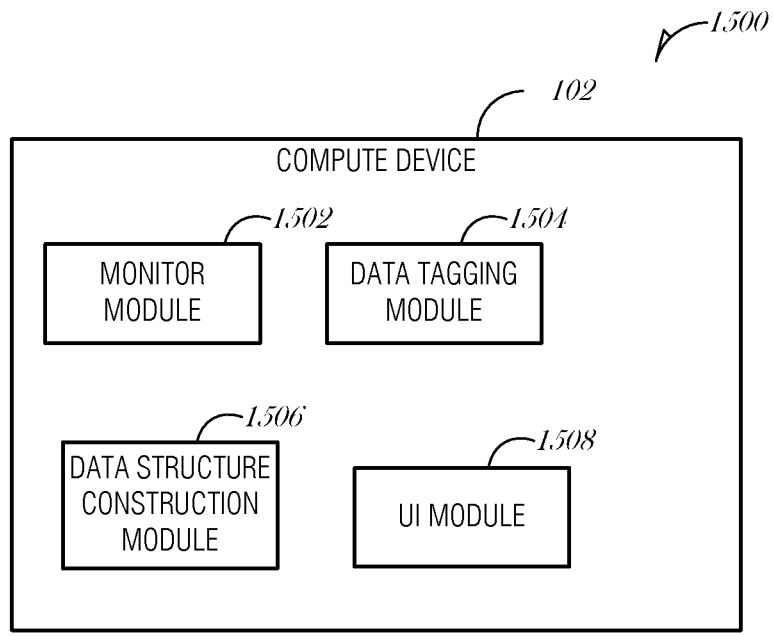
FIG. 15 is a block diagram illustrating a system for implementing an unstructured user interface, according to an embodiment.

FIG. 15 is a block diagram illustrating a system 1500 for implementing an unstructured user interface, according to an embodiment. The system includes a monitor module 1502, a data tagging module 1504, a data structure construction module 1506, and a user interface module 1508. The monitor module 1502 may be configured to monitor, at a compute device 102, input received at an electronic palette, the input producing a plurality of data elements. In an embodiment, the electronic palette comprises a word processing document.

The data tagging module 1504 may be configured to tag each of the plurality of data elements with a corresponding timestamp.

The data structure construction module 1506 may be configured to use the timestamps of the plurality of data elements to organize the plurality of data elements into a data structure. In an embodiment, to use the timestamps to organize the plurality of data elements into the data structure, the data structure construction module 1506 is to group data elements that were input relatively closely in time to one another as a record in the data structure.

The user interface module 1508 may be configured to present a user interface to a user of the compute device, the user interface based on the data structure. In an embodiment, to present the user interface, the user interface module 1508 is to present a user interface with a column name and a field value for each data element in a particular record. In a further embodiment, the user interface module 1508 is to receive user input identifying to revise the column name. In another embodiment, the user interface module 1508 is to receive user input to revise the data structure.

In an embodiment, the data tagging module 1504 is to tag each of the plurality of data elements with a corresponding input location on the electronic palette, and the data structure construction module 1506 is to use the input locations of the plurality of data elements to organize the plurality of data elements into the data structure.

In a further embodiment, to use the timestamps to organize the plurality of data elements into the data structure, the data structure construction module 1506 is to group data elements that were input relatively closely in time to one another as a record in the data structure, and to use the input locations of the plurality of data elements to organize the plurality of data elements into the data structure, the data structure construction module 1506 is to group data elements having that were input relatively closely in space to one another as a field in the record in the data structure. To be considered relatively close in time, the time between the inputs of each data element may be measured and a threshold delay may be calculated, such that a delay over the threshold delay may indicate a break from one record to another record. Similarly, to be considered relatively close in space, pixel positions (or screen coordinates) of the beginning of input of a first data element and a second data element may be compared to determine whether the data elements may be considered close in space. Closer input coordinates indicate that the data elements are part of the same record or field, while input coordinates that are far away indicate that the data elements should be associated with a different record or field.

In an embodiment, the data structure construction module 1506 is to analyze the plurality of data elements to identify a data type for data elements in the plurality of data elements.

In an embodiment, the data structure construction module 1506 is to identify an outlier data as a data element that fails to fit into the data structure. In a further embodiment, the data structure construction module 1506 is to process the outlier data into a plurality of sub-data elements, the plurality of sub-data elements conforming with the data structure. A sub-data element may be a word in a string, a number in a string, or other phrases or sub-phrases in a string. Such sub-data elements may be identified using word analysis (e.g., identifying a conjunction). In a further embodiment, to process the outlier data, the data structure construction module 1506 is to compare a sub-data element with a field in a current record to determine whether the sub-data element has a data type similar to that of the field. In another embodiment, to process the outlier data, the data structure construction module 1506 is to compare a sub-data element with a field in a foreign record to determine whether the sub-data element has a data type similar to that of the field. A foreign record is a different record other than the record where the data element or sub-data element under analysis is contained.

Figure 16:
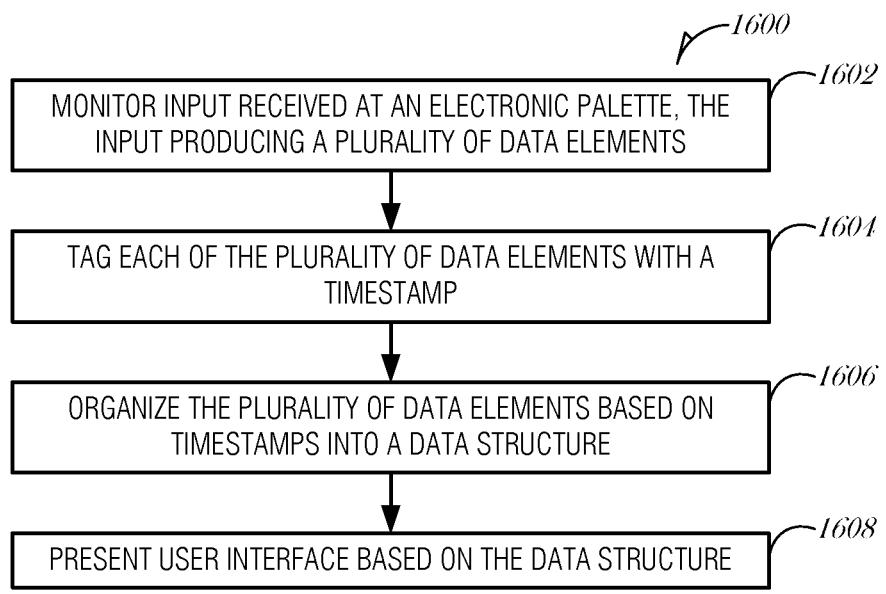
FIG. 16 is a flowchart illustrating a method of implementing an unstructured user interface, according to an embodiment.

FIG. 16 is a flowchart illustrating a method 1600 of implementing an unstructured user interface, according to an embodiment. At block 1602, input received at an electronic palette is monitored at a compute device, the input producing a plurality of data elements. In an embodiment, the electronic palette comprises a word processing document.

At block 1604, each of the plurality of data elements is tagged with a corresponding timestamp.

At block 1606, the timestamps of the plurality of data elements are used to organize the plurality of data elements into a data structure. In an embodiment, using the timestamps to organize the plurality of data elements into the data structure comprises grouping data elements that were input relatively closely in time to one another as a record in the data structure.

At block 1608, a user interface is presented to a user of the compute device, the user interface based on the data structure. In an embodiment, presenting the user interface comprises presenting a user interface with a column name and a field value for each data element in a particular record. In a further embodiment, the method 1600 includes receiving user input identifying to revise the column name. In another embodiment, the method 1600 includes receiving user input to revise the data structure.

In an embodiment, the method 1600 includes tagging each of the plurality of data elements with a corresponding input location on the electronic palette, and using the input locations of the plurality of data elements to organize the plurality of data elements into a data structure. In a further embodiment, using the timestamps to organize the plurality of data elements into the data structure comprises grouping data elements that were input relatively closely in time to one another as a record in the data structure, and using the input locations of the plurality of data elements to organize the plurality of data elements into the data structure comprises grouping data elements having that were input relatively closely in space to one another as a field in the record in the data structure.

In an embodiment, the method 1600 includes analyzing the plurality of data elements to identify a data type for data elements in the plurality of data elements.

In an embodiment, the method 1600 includes identifying an outlier data as a data element that fails to fit into the data structure. In a further embodiment, the method 1600 includes processing the outlier data into a plurality of sub-data elements, the plurality of sub-data elements conforming with the data structure. In a further embodiment, processing the outlier data comprises comparing a sub-data element with a field in a current record to determine whether the sub-data element has a data type similar to that of the field. In another embodiment, processing the outlier data comprises comparing a sub-data element with a field in a foreign record to determine whether the sub-data element has a data type similar to that of the field.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 17:
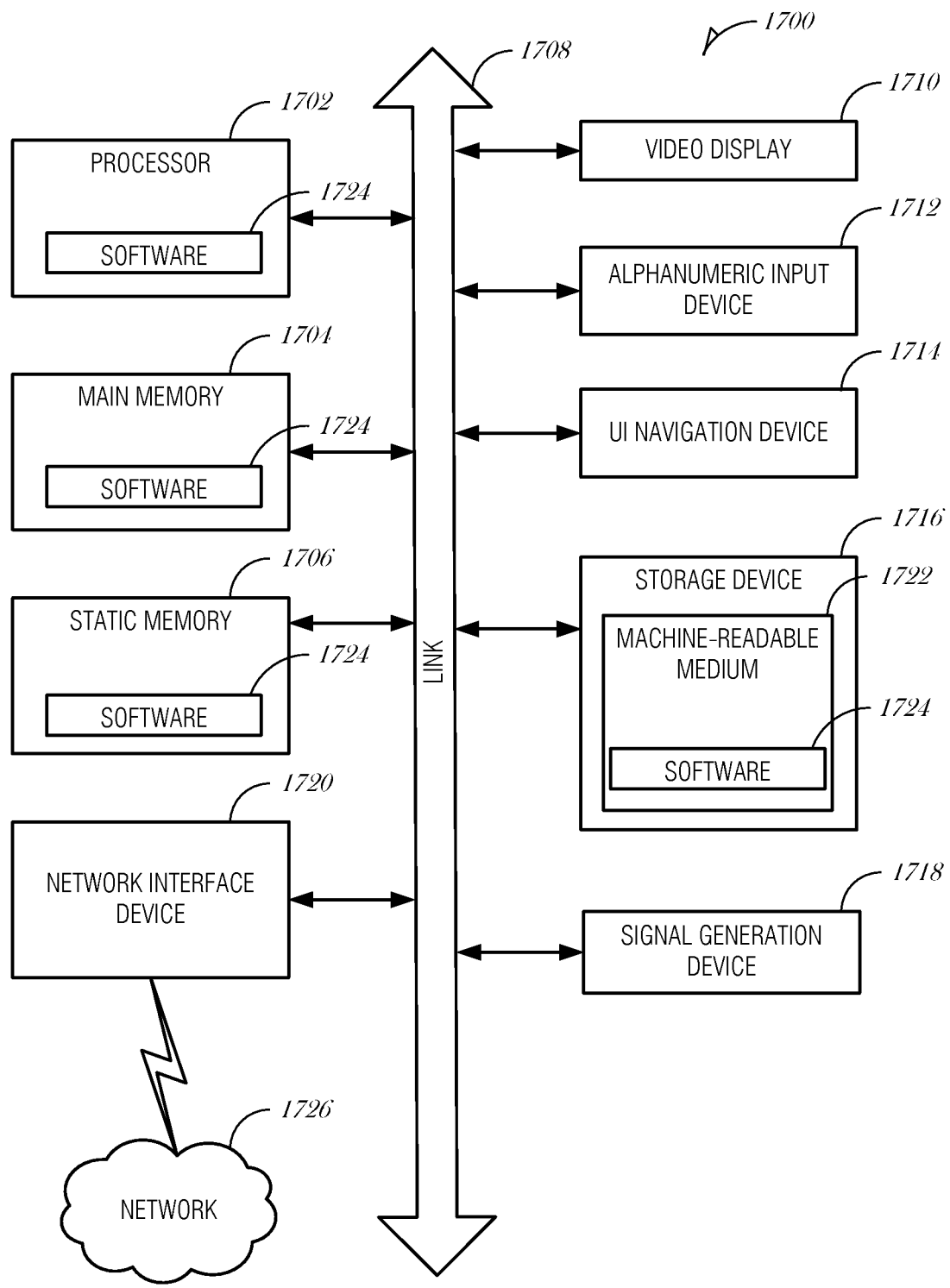
FIG. 17 is a block diagram illustrating an example machine upon which any one or more of the techniques (e.g., methodologies) discussed herein may perform, according to an example embodiment.

FIG. 17 is a block diagram illustrating a machine in the example form of a computer system 1700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1700 includes at least one processor 1702 (e.g., a central processing unit (CPU), a graphics processing unit (GPU) or both, processor cores, compute nodes, etc.), a main memory 1704 and a static memory 1706, which communicate with each other via a link 1708 (e.g., bus). The computer system 1700 may further include a video display unit 1710, an alphanumeric input device 1712 (e.g., a keyboard), and a user interface (UI) navigation device 1714 (e.g., a mouse). In one embodiment, the video display unit 1710, input device 1712 and UI navigation device 1714 are incorporated into a touch screen display. The computer system 1700 may additionally include a storage device 1716 (e.g., a drive unit), a signal generation device 1718 (e.g., a speaker), a network interface device 1720, and one or more sensors (not shown), such as a global positioning system (GPS) sensor, compass, accelerometer, or other sensor.

The storage device 1716 includes a machine-readable medium 1722 on which is stored one or more sets of data structures and instructions 1724 (e.g., software) embodying or utilized by any one or more of the methodologies or functions described herein. The instructions 1724 may also reside, completely or at least partially, within the main memory 1704, static memory 1706, and/or within the processor 1702 during execution thereof by the computer system 1700, with the main memory 1704, static memory 1706, and the processor 1702 also constituting machine-readable media.

While the machine-readable medium 1722 is illustrated in an example embodiment to be a single medium, the term "machine-readable medium" may include a single medium or multiple media (e.g., a centralized or distributed database, and/or associated caches and servers) that store the one or more instructions 1724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for implementing an unstructured user interface (such as a device, apparatus, or machine) comprising: a monitor module to monitor, at a compute device, input received at an electronic palette, the input producing a plurality of data elements; a data tagging module to tag each of the plurality of data elements with a corresponding timestamp; a data structure construction module to use the timestamps of the plurality of data elements to organize the plurality of data elements into a data structure; and a user interface module to present a user interface to a user of the compute device, the user interface based on the data structure.

In Example 2, the subject matter of Example 1 may include, wherein the electronic palette comprises a word processing document.

In Example 3, the subject matter of any one of Examples 1 to 2 may include, wherein to use the timestamps to organize the plurality of data elements into the data structure, the data structure construction module is to: group data elements that were input relatively closely in time to one another as a record in the data structure.

In Example 4, the subject matter of any one of Examples 1 to 3 may include, wherein to present the user interface, the user interface module is to: present a user interface with a column name and a field value for each data element in a particular record.

In Example 5, the subject matter of any one of Examples 1 to 4 may include, wherein the user interface module is to: receive user input identifying to revise the column name.

In Example 6, the subject matter of any one of Examples 1 to 5 may include, wherein the user interface module is to: receive user input to revise the data structure.

In Example 7, the subject matter of any one of Examples 1 to 6 may include, wherein the data tagging module is to tag each of the plurality of data elements with a corresponding input location on the electronic palette; and wherein the data structure construction module is to use the input locations of the plurality of data elements to organize the plurality of data elements into the data structure.

In Example 8, the subject matter of any one of Examples 1 to 7 may include, wherein to use the timestamps to organize the plurality of data elements into the data structure, the data structure construction module is to group data elements that were input relatively closely in time to one another as a record in the data structure; and wherein to use the input locations of the plurality of data elements to organize the plurality of data elements into the data structure, the data structure construction module is to group data elements having that were input relatively closely in space to one another as a field in the record in the data structure.

In Example 9, the subject matter of any one of Examples 1 to 8 may include, wherein the data structure construction module is to: analyze the plurality of data elements to identify a data type for data elements in the plurality of data elements.

In Example 10, the subject matter of any one of Examples 1 to 9 may include, wherein the data structure construction module is to: identify an outlier data as a data element that fails to fit into the data structure.

In Example 11, the subject matter of any one of Examples 1 to 10 may include, wherein the data structure construction module is to: process the outlier data into a plurality of sub-data elements, the plurality of sub-data elements conforming with the data structure.

In Example 12, the subject matter of any one of Examples 1 to 11 may include, wherein to process the outlier data, the data structure construction module is to: compare a sub-data element with a field in a current record to determine whether the sub-data element has a data type similar to that of the field.

In Example 13, the subject matter of any one of Examples 1 to 12 may include, wherein to process the outlier data, the data structure construction module is to: compare a sub-data element with a field in a foreign record to determine whether the sub-data element has a data type similar to that of the field.

Example 14 includes subject matter for implementing an unstructured user interface (such as a method, means for performing acts, machine readable medium including instructions that when performed by a machine cause the machine to performs acts, or an apparatus to perform) comprising: monitoring, at a compute device, input received at an electronic palette, the input producing a plurality of data elements; tagging each of the plurality of data elements with a corresponding timestamp; using the timestamps of the plurality of data elements to organize the plurality of data elements into a data structure; and presenting a user interface to a user of the compute device, the user interface based on the data structure.

In Example 15, the subject matter of Example 14 may include, wherein the electronic palette comprises a word processing document.

In Example 16, the subject matter of any one of Examples 14 to 15 may include, wherein using the timestamps to organize the plurality of data elements into the data structure comprises: grouping data elements that were input relatively closely in time to one another as a record in the data structure.

In Example 17, the subject matter of any one of Examples 14 to 16 may include, wherein presenting the user interface comprises: presenting a user interface with a column name and a field value for each data element in a particular record.

In Example 18, the subject matter of any one of Examples 14 to 17 may include, receiving user input identifying to revise the column name.

In Example 19, the subject matter of any one of Examples 14 to 18 may include, receiving user input to revise the data structure.

In Example 20, the subject matter of any one of Examples 14 to 19 may include, tagging each of the plurality of data elements with a corresponding input location on the electronic palette; and using the input locations of the plurality of data elements to organize the plurality of data elements into a data structure.

In Example 21, the subject matter of any one of Examples 14 to 20 may include, wherein using the timestamps to organize the plurality of data elements into the data structure comprises grouping data elements that were input relatively closely in time to one another as a record in the data structure; and wherein using the input locations of the plurality of data elements to organize the plurality of data elements into the data structure comprises grouping data elements having that were input relatively closely in space to one another as a field in the record in the data structure.

In Example 22, the subject matter of any one of Examples 14 to 21 may include, analyzing the plurality of data elements to identify a data type for data elements in the plurality of data elements.

In Example 23, the subject matter of any one of Examples 14 to 22 may include, identifying an outlier data as a data element that fails to fit into the data structure.

In Example 24, the subject matter of any one of Examples 14 to 23 may include, processing the outlier data into a plurality of sub-data elements, the plurality of sub-data elements conforming with the data structure.

In Example 25, the subject matter of any one of Examples 14 to 24 may include, wherein processing the outlier data comprises: comparing a sub-data element with a field in a current record to determine whether the sub-data element has a data type similar to that of the field.

In Example 26, the subject matter of any one of Examples 14 to 25 may include, wherein processing the outlier data comprises: comparing a sub-data element with a field in a foreign record to determine whether the sub-data element has a data type similar to that of the field.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter for implementing an unstructured user interface (such as a device, apparatus, or machine) comprising: means for monitoring, at a compute device, input received at an electronic palette, the input producing a plurality of data elements; means for tagging each of the plurality of data elements with a corresponding timestamp; means for using the timestamps of the plurality of data elements to organize the plurality of data elements into a data structure; and means for presenting a user interface to a user of the compute device, the user interface based on the data structure.

In Example 30, the subject matter of Example 29 may include, wherein the electronic palette comprises a word processing document.

In Example 31, the subject matter of any one of Examples 29 to 30 may include, wherein the means for using the timestamps to organize the plurality of data elements into the data structure comprise: means for grouping data elements that were input relatively closely in time to one another as a record in the data structure.

In Example 32, the subject matter of any one of Examples 29 to 31 may include, wherein presenting the user interface comprises: presenting a user interface with a column name and a field value for each data element in a particular record.

In Example 33, the subject matter of any one of Examples 29 to 32 may include, means for receiving user input identifying to revise the column name.

In Example 34, the subject matter of any one of Examples 29 to 33 may include, means for receiving user input to revise the data structure.

In Example 35, the subject matter of any one of Examples 29 to 34 may include, means for tagging each of the plurality of data elements with a corresponding input location on the electronic palette; and means for using the input locations of the plurality of data elements to organize the plurality of data elements into a data structure.

In Example 36, the subject matter of any one of Examples 29 to 35 may include, wherein the means for using the timestamps to organize the plurality of data elements into the data structure comprise means for grouping data elements that were input relatively closely in time to one another as a record in the data structure; and wherein the means for using the input locations of the plurality of data elements to organize the plurality of data elements into the data structure comprise means for grouping data elements having that were input relatively closely in space to one another as a field in the record in the data structure.

In Example 37, the subject matter of any one of Examples 29 to 36 may include, means for analyzing the plurality of data elements to identify a data type for data elements in the plurality of data elements.

In Example 38, the subject matter of any one of Examples 29 to 37 may include, means for identifying an outlier data as a data element that fails to fit into the data structure.

In Example 39, the subject matter of any one of Examples 29 to 38 may include, means for processing the outlier data into a plurality of sub-data elements, the plurality of sub-data elements conforming with the data structure.

In Example 40, the subject matter of any one of Examples 29 to 39 may include, wherein the means for processing the outlier data comprise: means for comparing a sub-data element with a field in a current record to determine whether the sub-data element has a data type similar to that of the field.

In Example 41, the subject matter of any one of Examples 29 to 40 may include, wherein the means for processing the outlier data comprise: means for comparing a sub-data element with a field in a foreign record to determine whether the sub-data element has a data type similar to that of the field.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for implementing an unstructured user interface, the system comprising:
   a hardware processor; and
   a memory device including instructions, which when executed by the hardware processor, cause the hardware processor to implement:
   a monitor circuit to monitor, at a compute device, input received at an electronic palette, the input producing a plurality of data elements;
   a data tagging circuit to tag each of the plurality of data elements with a corresponding timestamp, and tag each of the plurality of data elements with a corresponding input location on the electronic palette, the input location comprising screen coordinates on the electronic palette corresponding to where each data element was drawn;
   a data structure construction circuit to use the timestamps and the input locations of the plurality of data elements to construct the plurality of data elements into a data structure, based on a machine learning algorithm, wherein the timestamps are used to define records of the data structure, the input locations are used to define fields of the data structure, and carriage returns in the plurality of data elements are used to define one-to-many, many-to-one, or many-to-many relationships in the data structure; and
   a user interface circuit to present a user interface to a user of the compute device, the user interface based on the data structure, and the user interface to receive changes to the data structure that revise the machine learning algorithm;
   wherein to use the input locations of the plurality of data elements to construct the plurality of data elements into the data structure, the data structure construction circuit is to:
   detect the input locations of each of the plurality of data elements; and
   organize the plurality of data elements into a plurality of fields in a record of the data structure, wherein data elements that were input relatively closely in space to one another are organized as a single field in the plurality of fields in the record in the data structure and data elements that were input relatively far in space from one another are organized as separate multiple fields in the plurality of fields in the data structure.

2. The system of claim 1, wherein the electronic palette comprises a word processing document.

3. The system of claim 1, wherein to use the timestamps to construct the plurality of data elements into the data structure, the data structure construction circuit is to: group data elements that were input relatively closely in time to one another as a record in the data structure.

4. The system of claim 1, wherein to present the user interface, the user interface circuit is to:
   present a user interface with a column name and a field value for each data element in a particular record.

5. The system of claim 4, wherein the user interface circuit is to:
   receive user input identifying to revise the column name.

6. The system of claim 4, wherein the user interface circuit is to:
   receive user input to revise the data structure.

7. The system of claim 1, wherein to use the timestamps to organize construct the plurality of data elements into the data structure, the data structure construction circuit is to group data elements that were input relatively closely in time to one another as a record in the data structure.

8. The system of claim 1, wherein the data structure construction circuit is to:
   analyze the plurality of data elements to identify a data type for data elements in the plurality of data elements.

9. The system of claim 1, wherein the data structure construction circuit is to:
   identify an outlier data as a data element that fails to fit into the data structure.

10. The system of claim 9, wherein the data structure construction circuit is to:
    process the outlier data into a plurality of sub-data elements, the plurality of sub-data elements conforming with the data structure.

11. The system of claim 10, wherein to process the outlier data, the data structure construction circuit is to:
    compare a sub-data element with a field in a current record to determine whether the sub-data element has a data type similar to that of the field.

12. The system of claim 10, wherein to process the outlier data, the data structure construction circuit is to:

compare a sub-data element with a field in a foreign record to determine whether the sub-data element has a data type similar to that of the field.

13. A method of implementing an unstructured user interface, the method comprising:
    monitoring, at a compute device, input received at an electronic palette, the input producing a plurality of data elements;
    tagging each of the plurality of data elements with a corresponding timestamp;
    tagging each of the plurality of data elements with a corresponding input location on the electronic palette, the input location comprising screen coordinates on the electronic palette corresponding to where each data element was drawn;
    using the timestamps and the input locations of the plurality of data elements to construct the plurality of data elements into a data structure, wherein the timestamps are used to define records of the data structure, the input locations are used to define fields of the data structure, and carriage returns in the plurality of data elements are used to define one-to-many, many-to-one, or many-to-many relationships in the data structure; and
    presenting a user interface to a user of the compute device, the user interface based on the data structure;
    wherein to use the input locations of the plurality of data elements to construct the plurality of data elements into the data structure includes:
        detecting the input locations of each of the plurality of data elements; and
        organizing the plurality of data elements into a plurality of fields in a record of the data structure, wherein data elements that were input relatively closely in space to one another are organized as a single field in the plurality of fields in the record in the data structure and data elements that were input relatively far in space from one another are organized as separate multiple fields in the plurality of fields in the data structure.

14. The method of claim 13, wherein the electronic palette comprises a word processing document.

15. The method of claim 13, wherein using the timestamps to construct the plurality of data elements into the data structure comprises:
    grouping data elements that were input relatively closely in time to one another as a record in the data structure.

16. The method of claim 13, wherein presenting the user interface comprises:
    presenting a user interface with a column name and a field value for each data element in a particular record.

17. The method of claim 16, further comprising:
    receiving user input identifying to revise the column name.

18. The method of claim 16, further comprising:
    receiving user input to revise the data structure.

19. At least one non-transitory machine-readable medium including instructions, which when executed by a machine, cause the machine to:
    monitor, at a compute device, input received at an electronic palette, the input producing a plurality of data elements;
    tag each of the plurality of data elements with a corresponding timestamp;
    tag each of the plurality of data elements with a corresponding input location on the electronic palette, the input location comprising screen coordinates on the electronic palette corresponding to where each data element was drawn;
    use the timestamps and the input locations of the plurality of data elements to construct the plurality of data elements into a data structure, wherein the timestamps are used to define records of the data structure, the input locations are used to define fields of the data structure, and carriage returns in the plurality of data elements are used to define one-to-many, many-to-one, or many-to-many relationships in the data structure; and
    present a user interface to a user of the compute device, the user interface based on the data structure;
    wherein to use the input locations of the plurality of data elements to construct the plurality of data elements into the data structure includes:
        detecting the input locations of each of the plurality of data elements; and
        organizing the plurality of data elements into a plurality of fields in a record of the data structure, wherein data elements that were input relatively closely in space to one another are organized as a single field in the plurality of fields in the record in the data structure and data elements that were input relatively far in space from one another are organized as separate multiple fields in the plurality of fields in the data structure.

20. The at least one non-transitory machine-readable medium of claim 19, wherein the instructions to use the timestamps to construct the plurality of data elements into the data structure comprise instructions to:
    group data elements that were input relatively closely in time to one another as a record in the data structure.

21. The at least one non-transitory machine-readable medium of claim 19, wherein the instructions to present the user interface comprise instructions to:
    present a user interface with a column name and a field value for each data element in a particular record.

22. The at least one non-transitory machine-readable medium of claim 19, further comprising instructions to:
    tag each of the plurality of data elements with a corresponding input location on the electronic palette; and
    use the input locations of the plurality of data elements to construct the plurality of data elements into a data structure.

23. The at least one non-transitory machine-readable medium of claim 22, wherein the instructions to use the timestamps to construct the plurality of data elements into the data structure comprise instructions to group data elements that were input relatively closely in time to one another as a record in the data structure.

24. The at least one non-transitory machine-readable medium of claim 19, further comprising instructions to:
    identify an outlier data as a data element that fails to fit into the data structure.

* * * * *

UNITED STATES PATENT AND TRADEMARK OFFICE
CERTIFICATE OF CORRECTION

PATENT NO. : 10,922,474 B2  
APPLICATION NO. : 14/667222  
DATED : February 16, 2021  
INVENTOR(S) : Vaughn et al.

Page 1 of 1

It is certified that error appears in the above-identified patent and that said Letters Patent is hereby corrected as shown below:

On the Title Page

Item (71), in "Applicant", in Column 1, Lines 1-7, delete "Robert Lawson Vaughn, Portland, OR (US); Tobias Kohlenberg, Portland, OR (US); Michael Moran, Naas (IE); Charles Baron, Chandler, AZ (US); Stephen Chadwick, Chandler, AZ (US); Munir Ghamrawi, Hillsboro, OR (US)" and insert --Intel Corporation, Santa Clara, CA (US)-- therefor Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*